(12) United States Patent
Nakashita

(10) Patent No.: US 8,465,156 B2
(45) Date of Patent: Jun. 18, 2013

(54) IMAGE PROJECTION APPARATUS HAVING CLEANING FUNCTION OF AIR FILTER

(75) Inventor: Daisuke Nakashita, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 349 days.

(21) Appl. No.: 13/005,889

(22) Filed: Jan. 13, 2011

(65) Prior Publication Data

US 2011/0181845 A1 Jul. 28, 2011

(30) Foreign Application Priority Data

Jan. 25, 2010 (JP) .................. 2010-013680

(51) Int. Cl.
*G03B 21/18* (2006.01)
*G03B 21/26* (2006.01)
*G03B 21/14* (2006.01)
*G03B 21/22* (2006.01)
*G03B 21/00* (2006.01)

(52) U.S. Cl.
USPC ................ 353/58; 353/57; 353/119; 353/122

(58) Field of Classification Search
USPC ............... 353/31, 52, 55, 57–58, 60–61, 119, 353/122; 312/229
See application file for complete search history.

(56) References Cited

U.S. PATENT DOCUMENTS

| 7,234,818 | B2 * | 6/2007 | Hsieh | 353/57 |
| 7,276,108 | B2 * | 10/2007 | Wei et al. | 95/282 |
| 7,677,962 | B2 * | 3/2010 | Chang | 454/184 |
| 7,753,533 | B2 * | 7/2010 | Kaneko | 353/61 |
| 8,334,783 | B2 * | 12/2012 | Katayama et al. | 340/635 |

FOREIGN PATENT DOCUMENTS

JP 2004-064010 A 2/2004

* cited by examiner

*Primary Examiner* — Tony Ko
*Assistant Examiner* — Jori S Reilly-Diakun
(74) *Attorney, Agent, or Firm* — Rossi, Kimms & McDowell LLP

(57) ABSTRACT

An image projection apparatus includes cooling fans 10, 12, and 16 provided inside a chassis 17 and configured to take in cooling air from a cooling inlet port 17a formed in the chassis, an air filter 22 that covers the cooling inlet port, an exhaust port 19a formed in the chassis and configured to exhaust the cooling air from an inside to an outside of the chassis, and a cleaning fan 25 provided inside the chassis and configured to take in cleaning air from a cleaning inlet port 17b formed in the chassis separately from the exhaust port. The image projection apparatus exhausts the cleaning air discharged from the cleaning fan, from the inside to the outside of the chassis via the cooling inlet port and the air filter.

5 Claims, 7 Drawing Sheets

IMAGE PROJECTION APPARATUS HAVING CLEANING FUNCTION OF AIR FILTER

BACKGROUND OF THE INVENTION

1. Field of the Invention

The present invention relates to an image projection apparatus such as a liquid crystal projector, and more particularly to an image projection apparatus having a cleaning function of an air filter.

2. Description of the Related Art

The image projection apparatus (Hereinafter, referred to as a projector) as described above is provided with a cooling fan in a chassis in order to cool a light source such as a lamp or an optical modulation element such as a liquid crystal panel. An inlet port that is formed in the chassis to take in outside air as cooling air by the cooling fan is covered with a dust-proof air filter.

The clogging of the air filter caused by dusts may be generated by the use of the projector for a long time. Therefore, the air filter needs to be cleaned regularly or if necessary. Japanese Patent Laid-Open No. 2004-064010 discloses a projector that cleans an air filter by rotating a cooling fan reversely with reference to a normal drive (i.e. at the time of cooling operation) to flow the air in a chassis to an inlet port to blow off the dusts deposited on the air filter.

However, in the projector disclosed in Japanese Patent Laid-Open No. 2004-064010, the cleaning air sprayed on the air filter is air in the chassis. In this case, since the pressure difference is generated between the inside and the outside of the chassis, the cleaning air is inevitably suctioned from the outside of the chassis. Taking the cleaning air from the outside of the chassis is performed via an exhaust port of the cooling air that is provided in the chassis.

Therefore, in order to prevent the dusts from taking in the chassis, an air filter also needs to be provided in the exhaust port of the cooling air.

Moreover, in this projector, a flow path resistance of the air exhausted to the outside of the chassis via the exhaust port during the normal drive increases caused by providing the air filter in the exhaust port of the cooling air, and the necessity of increasing the output of the cooling fan is created or the noise is increased.

SUMMARY OF THE INVENTION

The present invention provides an image projection apparatus that has a good cleaning function of an air filter without causing the addition of an air filter to an exhaust port or the increases of an output and a noise of a cooling fan.

An image projection apparatus as one aspect of the present invention includes a cooling fan provided inside a chassis of the image projection apparatus and configured to take in cooling air from a cooling inlet port formed in the chassis, an air filter that covers the cooling inlet port, an exhaust port formed in the chassis and configured to exhaust the cooling air from an inside to an outside of the chassis, and a cleaning fan provided inside the chassis and configured to take in cleaning air from a cleaning inlet port formed in the chassis separately from the exhaust port. The image projection apparatus exhausts the cleaning air discharged from the cleaning fan, from the inside to the outside of the chassis via the cooling inlet port and the air filter.

Further features and aspects of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

Embodiment 1

Whole configuration of a projector

Figure 1:
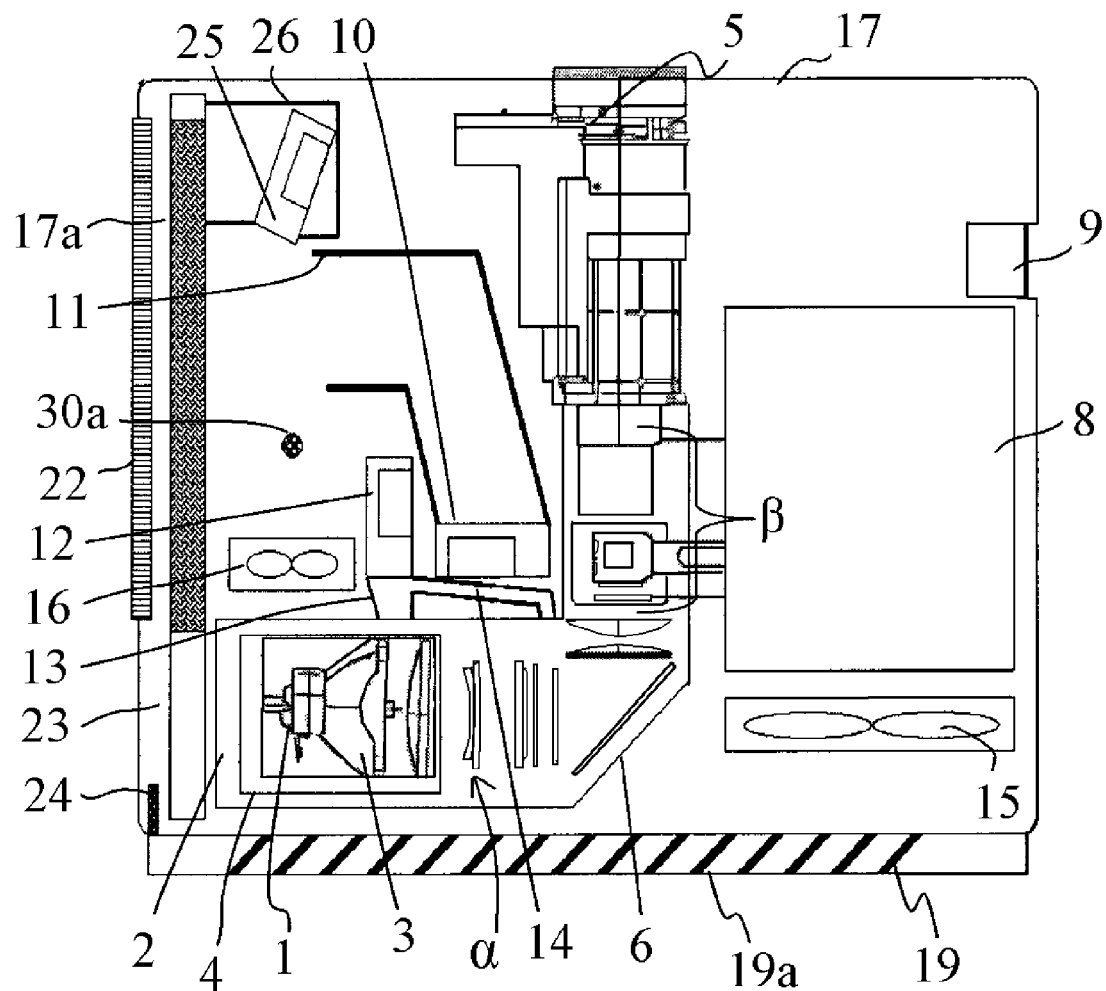
FIG. 1 is a top view of a projector that is Embodiment 1 of the present invention.

FIG. 1 illustrates a configuration of a liquid crystal projector (an image projection apparatus) that is Embodiment 1 of the present invention.

In FIG. 1, reference numeral 1 denotes a light source lamp (hereinafter, referred to simply as a lamp), and a high-pressure mercury discharge lamp is used in the embodiment. However, a discharge lamp such as a halogen lamp, a xenon lamp, or a metal halide lamp, other than the high-pressure mercury discharge lamp, may also be used as the lamp 1.

Reference numeral 2 denotes a lamp holder that holds the lamp 1 using a biasing force from a plurality of spring materials (not shown). Reference numeral 3 denotes an explosion-proof convex lens, and reference numeral 4 denotes a lamp unit that is constituted by the lamp 1, the lamp holder 2, the explosion-proof convex lens 3, and the like.

Reference character α denotes an illumination optical system that converts luminous flux from the lamp 1 into parallel luminous flux that has a uniform brightness distribution. Reference character β denotes a color separation/synthesis optical system that separates colors of light from the illumination optical system a to lead to a liquid crystal panel for three colors of RGB described below to synthesize the colors of the light from the liquid crystal panel.

Reference numeral 5 denotes a projection lens that projects the light (an image) from the color separation/synthesis optical system β onto a screen (a projected plane) that is not shown. A projection optical system (not shown) is housed in the projection lens 5.

Reference numeral 6 denotes an optical box where the lamp unit 4, the illumination optical system α, and the color separation/synthesis optical system β are housed and the projection lens 5 is fixed.

Reference numeral 7 denotes an optical box lid that covers the optical box 6 with the illumination optical system α and the color separation/synthesis optical system β housed in the optical box 6.

Reference numeral 8 denotes a power supply/ballast unit, which includes a PFC power supply board that generates a DC power supplied from a commercial power supply to each board, or a ballast power supply that is electrically connected to the PFC power supply board to light the lamp 1.

Reference numeral 9 denotes an AC inlet, which it is built into an exterior cabinet 17 described below to supply the commercial power to the power supply/ballast unit 8.

Reference numeral 10 denotes an optical cooling fan, which cools the power supply/ballast unit 8 with cooling air (outside air) that is taken from a cooling inlet port 17*a* formed in an exterior cabinet 17 and that is discharged. Reference numeral 11 denotes an RGB duct to lead the cooling air that flows in from the cooling inlet port 17*a* to the optical cooling fan 10 smoothly.

Reference numeral 12 denotes a first lamp cooling fan, which cools the lamp 1 by spraying the cooling air that is taken from the cooling inlet port 17*a* and that is discharged onto the lamp 1. Reference numeral 13 denotes a first lamp duct that holds the first lamp cooling fan 12 and leads the cooling air discharged from the first lamp cooling fan 12 to the lamp 1. Reference numeral 14 denotes a second lamp duct that leads the cooling air discharged from the first lamp duct 12 to a polarization conversion element 45 described below in combination with the first lamp duct 13.

Reference numeral 15 denotes a power supply exhaust fan, which is held by the power supply/ballast unit 8. The power supply exhaust fan 15 cools the power supply/ballast unit 8 with the cooling air that is taken from the cooling inlet port 17*a* and that is discharged. The power supply exhaust fan 15 also sucks in the discharged air from the optical cooling fan 10. The air by which the power supply/ballast unit 8 has been cooled is exhausted from an exhaust port 19*a* described below to the outside of a chassis.

Reference numeral 16 denotes a second lamp cooling fan, which cools the lamp 1 by the cooling air that is taken from the cooling inlet port 17*a* and that is discharged. The air that is discharged from the first lamp cooling fan 12 and the second lamp cooling fan 16 and that is used to cool the lamp 1 is exhausted from the exhaust port 19*a* to the outside of the chassis.

The exterior cabinet 17 constitutes the chassis along with the exterior cabinet lid 18, by covering the exterior cabinet 17 with the exterior cabinet lid 18 in a state where the lamp 1, the lamp optical box 6, the power supply/ballast unit 8, and the fans 12, 13, 15, and 16, and the like are housed. As described above, the cooling inlet port 17*a* is formed in the exterior cabinet 17.

A cleaning inlet port 17*b* to take the cleaning air (the outside air) by a cleaning fan 25 described below is formed in the exterior cabinet 17. The cleaning inlet port 17*b* is an opening that is formed separately from the cooling inlet port 17*a* and the exhaust port 19*a*. The cooling inlet port 17*a* and the cleaning inlet port 17*b* are formed so as to be adjacent to each other on the same side surface of the exterior cabinet 17. Moreover, a plurality of interface elements are held on the exterior cabinet lid 18.

Reference numeral 19 denotes an exhaust lid, which has an exhaust port 19*a* exhausting the air from the inside to the outside of the chassis described above. The exhaust lid 19 is provided to be able to be opened and closed with respect to the exterior cabinet 17 and the exterior cabinet lid 18.

Reference numeral 22 denotes an air filter that covers the cooling inlet port 17*a* and removes the dust contained in the outside air taken in the chassis. The air filter 22 preferably has a pleat shape. An area contacting with the air flowing from the outside into the inside of the chassis is enlarged by the pleat shape to be able to slow down the flow velocity of the air to the air filter 22 and therefore the dust is more easily captured by the air filter 22 due to slow the velocity down.

Reference numeral 23 denotes an air filter holder that is attached to the exterior cabinet 17 to hold the air filter 22.

Reference numeral 24 denotes an exhaust lid sensor that is provided to be adjacent to the exhaust lid 19 to detect the opening and closing states of the exhaust lid 19.

Reference numeral 25 denotes a cleaning fan, which discharges the cooling air taken from the cleaning inlet port 17*b*. The cleaning fan discharged from the cleaning fan 25 is exhausted from the inside to the outside of the chassis via the air filter 22. As a result, the dust that adheres to (deposits on) the air filter 22 is blown away, and the air filter 22 is cleaned.

Reference numeral 26 denotes a cleaning fan box that holds the cleaning fan 25 and that has a partition structure so that the cleaning fan 25 can take the cleaning air only from the cleaning inlet port 17*b*.

Reference numeral 30*a* denotes an inlet port temperature sensor that detects the temperature in the chassis in the inside of the chassis (near the cooling inlet port 17*a*).

Optical configuration

Figure 2A:
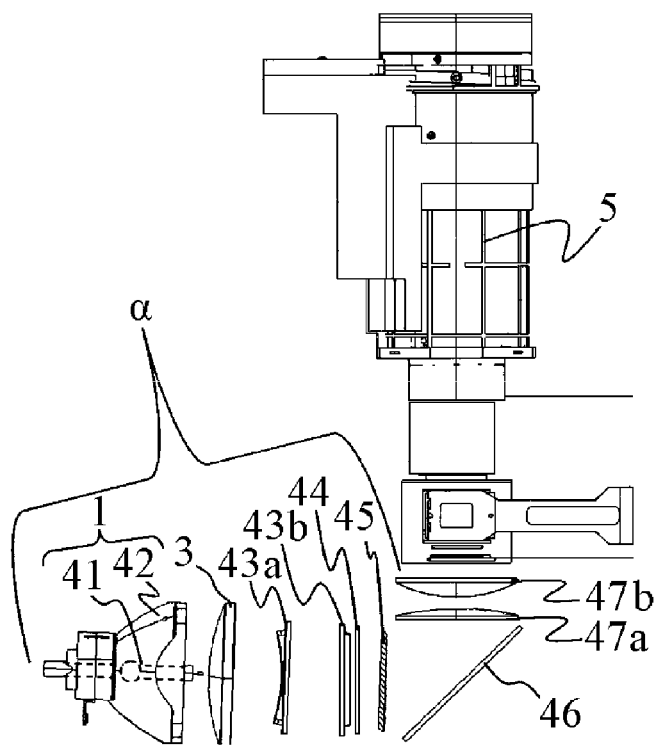
FIGS. 2A and 2B are a top view and a side view, respectively, that illustrate an optical configuration of a projector of Embodiment 1.
Figure 2B:
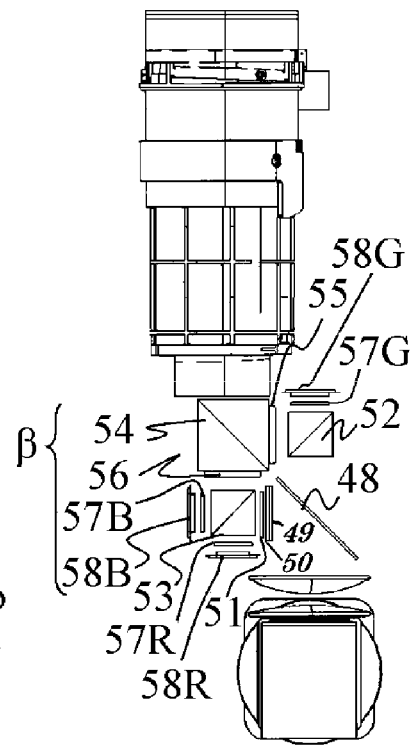

An optical configuration of a projector of the embodiment is illustrated in FIGS. 2A and 2B. White light from the lamp 1 constituted by a luminescence tube 41 and a reflector 42 is led to a color separation/synthesis optical system β via the illumination optical system α. The illumination optical system α is constituted by an explosion-proof convex lens 3, a first fly-eye lens 43*a*, a second fly-eye lens 43*b*, an ultraviolet rays absorption filter 44, and a polarization conversion element 45, and it divides the light from the lamp 1 into a plurality of luminous fluxes to convert it into lights having a predetermined polarization direction. Moreover, the illumination optical system α includes a mirror 46, a first condenser lens 47*a*, and a second condenser lens 47*b*, and it changes a traveling direction of the plurality of luminous fluxes and overlaps the plurality of luminous fluxes on each liquid crystal panel described below.

The color separation/synthesis optical system β separates the incident white light into red light (R), green light (G), and blue light (B) to lead each of the lights to an R liquid crystal panel 58R, a G liquid crystal panel 58G, and a B liquid crystal panel 58B. The liquid crystal panel (the optical modulation element) of the embodiment is a reflective liquid crystal panel, but a transmissive liquid crystal panel may also be used. The red light, the green light, and the blue light modulated by the R liquid crystal panel 58R, the G liquid crystal panel 58G, and the B liquid crystal panel 58B, respectively, are synthesized by the color separation/synthesis optical system β to enter the projection lens 5, and they are projected on the screen by the projection lens 5.

In the color separation/synthesis optical system β, reference numeral 48 denotes a dichroic mirror that separates the white light from the illumination optical system α into the green light, the red light, and the blue light. The green light transmitted through the dichroic mirror 48 enters a polarizing beam splitter 52. The polarizing beam splitter 52 transmits or reflects the incident green light in accordance with its polarization direction.

The Green light transmitted through the polarization beam splitter 52 transmits through a quarter wavelength plate 57G and enters the G liquid crystal panel 58G. The green light modulated by the G liquid crystal panel 58G transmits through the quarter wavelength plate 57G again to be reflected on the polarizing beam splitter 52, and it is detected by a G polarizing plate 55 to enter a color synthesis prism 54.

Red light and blue light that are reflected by the dichroic mirror 48 to be transmitted through a trimming filter 49, a polarizing plate 50, and a color selector 51 enter a polarizing beam splitter 53. The polarizing beam splitter 53 transmits and reflects each of the incident red light and blue light in accordance with its polarization direction.

The red light reflected by the polarizing beam splitter 53 transmits through a quarter wavelength plate 57R to enter the R liquid crystal panel 58R. Moreover, the blue light transmitted through the polarizing beam splitter 53 transmits a quarter wavelength plate 57B to enter the B liquid crystal panel 58B.

The red light modulated by the R liquid crystal panel 58R transmits through the quarter wavelength plate 57R and the polarizing beam splitter 53, and it transmits through the B polarizing plate 56 as it is to enter the color synthesis prism 54. Moreover, the blue light modulated by the B liquid crystal panel 61B transmits through the quarter wavelength plate 57B, and after that, it is reflected by the polarizing beam splitter 53 and is detected by the B polarizing plate 56 to enter the color synthesis prism 54.

The color synthesis prism 54 synthesizes the incident green light, red light, and blue light to lead to the projection lens 5.

Cooling structure

Figure 3:
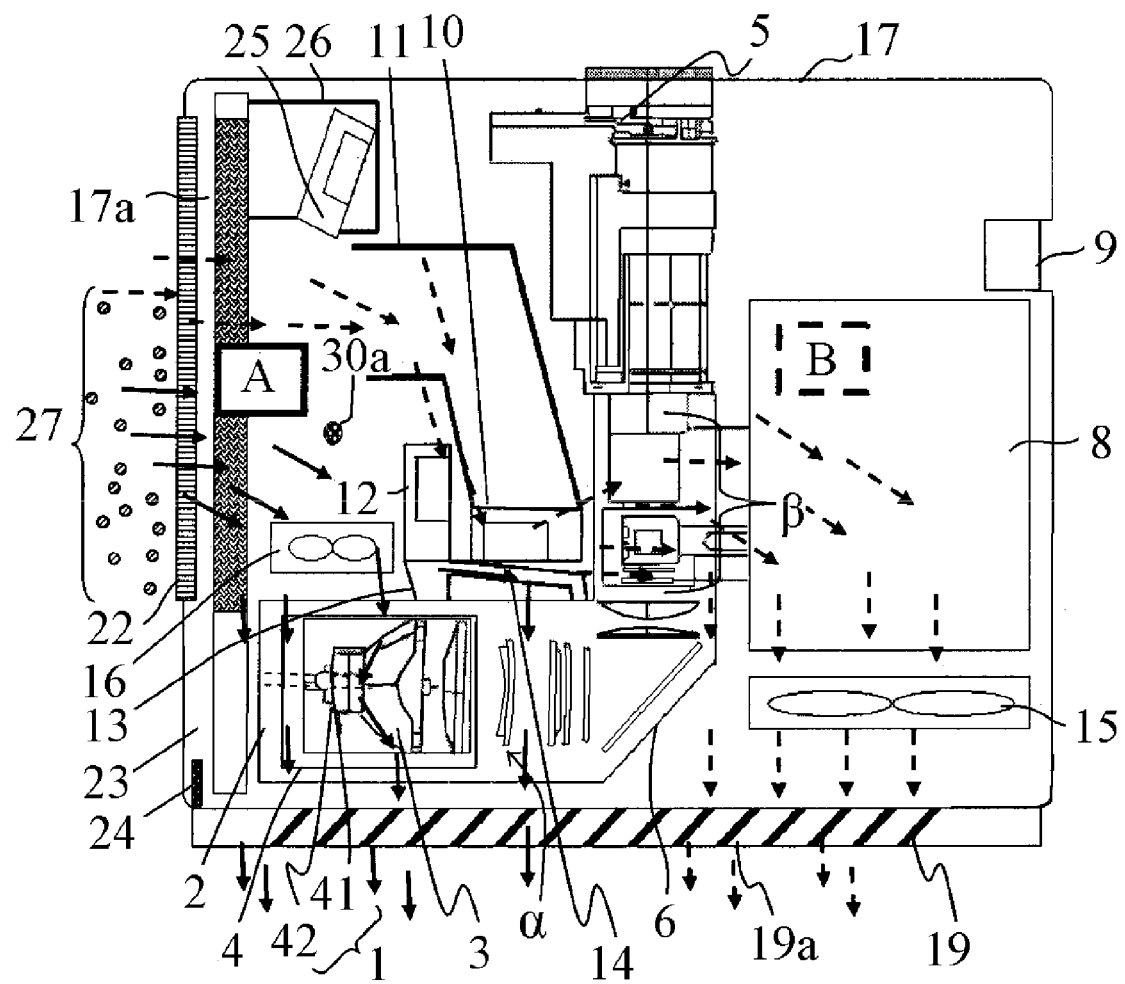
FIG. 3 is a top view illustrating a cooling structure in a projector of Embodiment 1.

Next, referring to FIG. 3, the cooling structure in the projector of the embodiment will be described. The projector of the embodiment, as described above, includes four fans for cooling and heat the rejection, and forms two cooling airflow paths where the cooling air flows using these four fans. In FIG. 3, a cooling airflow path A and a cooling airflow path B are indicated by a solid line arrow and dotted line arrow, respectively.

First of all, the cooling airflow path A will be described. Air (cooling air) outside the chassis flows in from the cooling inlet port 17a to the inside of the chassis via the air filter 22 by the rotations of the first lamp cooling fan 12 and the second lamp cooling fan 16.

The cooling air discharged from the first lamp cooling fan 12 is sent to a space formed with the lamp 1, the lamp holder 2, and the explosion-proof convex lens 3 in the lamp unit 4 via the first lamp duct 13 and an opening (not shown) provided in the lamp holder 2. The cooling air mainly cools the luminescence tube 41 of the lamp 1. The air that cools the luminescence tube 41 is exhausted from the lamp unit 4 via an opening (not shown) provided in the lamp holder 2. The cooling air exhausted from the lamp unit 4 flows toward the exhaust lid 19, and is exhausted to the outside of the chassis via the exhaust port 19a.

A part of the cooling air discharged from the first lamp cooling fan 12 flows the inside of the optical box 6 via the second lamp duct 14 and an opening (not shown) provided in the optical box 6 to cool the polarization conversion element 45. The cooling air by which the polarization conversion element 45 is cooled down flows toward the exhaust lid 19, and is exhausted outside the chassis via the exhaust port 19a.

The cooling air discharged from the second lamp cooling fan 16 flows an outer circumference of a reflector 42 to cool the outer circumference of the lamp unit 4, and then, it flows toward the exhaust lid 19 to be exhausted from the exhaust port 19a to the outside of the chassis.

Next, the cooling airflow path B will be described. Air (cooling air) outside the chassis flows from the cooling inlet port 17a to the inside of the chassis via the air filter 22 by the rotation of the optical cooling fan 10, and it is sucked in the optical cooling fan 10 via the RGB duct 11. The cooling air discharged from the optical cooling fan 10 flows to the inside of the optical box 6 via a duct (not shown) and an opening (not shown) provided in the optical box 6 to cool each optical element (a liquid crystal panel and the like) of the color separation/synthesis optical system β.

Next, the cooling air that cools each optical element of the color separation/synthesis optical system β flows in the power supply/ballast unit 8. The air that flows in the power supply/ballast unit 8 flows so as to be headed to the power supply exhaust fan 15 by the rotation of the power supply exhaust fan 15, and at this time it cools each element of the power supply and the ballast. Then, the cooling air discharged from the power supply exhaust fan 15 is exhausted to the outside of the chassis via the exhaust port 19a.

The power supply exhaust fan 15 generates the flow of the air that is discharged from the optical cooling fan 10 to cool the color separation/synthesis optical system β and the power supply/ballast unit 8, as well as the flow of the air that flows from the cooling inlet port 17a to the inside the chassis to round the whole of the inside of the chassis.

In the cooling structure to form such cooling airflow path A and cooling airflow path B, resistance to the flow of air increases when the clogging of the air filter 22 is generated along with a continuous use for a long time or an obstacle is provided near the cooling inlet port 17a. The flow rate of the air that circulates the inside and outside of the chassis decreases due to the increase of the resistance, and as a result, the temperature inside the chassis rises.

Therefore, in the projector of the embodiment, when the temperature in the chassis detected by the inlet port temperature sensor 30a exceeds a predetermined threshold value, the power supplied from the power supply/ballast unit 8 to each part is stopped. The threshold value is set so that the longevity of various elements in the projector is not deteriorated by an excessive temperature rise.

Next, referring to FIG. 4, the cleaning operation of the air filter 22 in the projector of the embodiment will be described. Dusts 27 adhere and are deposited in an area which covers the cooling inlet port 17a of the air filter 22 by the air of the outside of the chassis sucked by the rotations of the optical cooling fan 10, the first lamp cooling fan 12, and the second lamp cooling fan 16. In the cleaning operation, the deposited dusts 27 are removed by the flow of air by the rotation of the cleaning fan 25.

Figure 4:
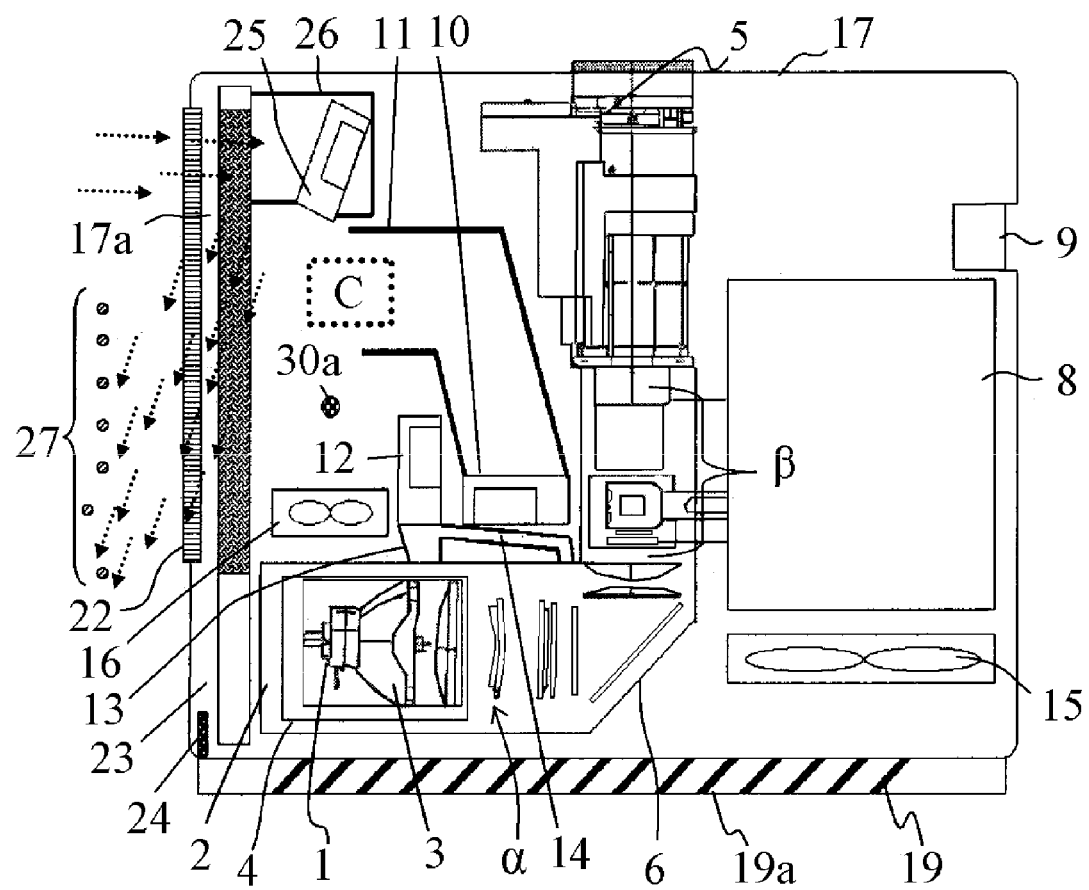
FIG. 4 is a top view illustrating an air filter cleaning operation in a projector of Embodiment 1.

FIG. 4 illustrates an airflow path (cleaning air) that flows by the rotation of the cleaning fan 25 at the time of the cleaning operation of the air filter 22 as a cleaning airflow path C. At the time of the cleaning operation, all of the optical cooling fan 10, the first lamp cooling fan 12, the second lamp cooling fan 16, and the power supply exhaust fan 15 stop.

The outside air (cleaning air) that flows from the outside of the chassis to the inside of the chassis via the cleaning inlet port 17b and the air filter 22 by the rotation of the cleaning fan 25 is flowed into the cleaning fan box 26 to be sucked into the cleaning fan 25. The cleaning fan 25 is held by the cleaning fan box 26 so that its discharge port is tilted with respect to the cooling inlet port 17a to face it.

The cleaning air discharged from the cleaning fan 25 flows toward the air filter 22 through a location near the RGB duct 11, and blows off the dusts 27 that are deposited at the outside of the air filter 22 toward the outside of the chassis. As a result, the air filter 22 is cleaned.

For example, such cleaning operation may be performed at every shut down operation of the projector (power shutdown). As a result, the state in which the dusts do not adhere to the air filter 22 covering the cooling inlet port 17a can be maintained at every start-up operation of the projector (power activation).

The cleaning operation may also be performed by a controller such as a CPU (not shown) automatically in accordance with the temperature detected by the inlet port temperature sensor 30a higher than a threshold value. In other words, the clogging of the air filter may also be detected by using the inlet port temperature sensor 30a to operate the cleaning fan 25 automatically using a controller in accordance with the output of the sensor 30a. As a result, the cleaning operation is not performed in a condition where there is no clogging in the air filter 22 and there is no need to clean the air filter 22 even if the projector is shut down, and a necessary cleaning operation can only be performed by the controller. The threshold value for the inlet port temperature sensor 30a in this case may be different from the threshold value for shutting down the power supply described above.

Repeating the cleaning operation, the dusts adhere to and are deposited on the area where the cleaning inlet port 17b of the air filter 22 is covered, and therefore the air filter 22 causes the clogging. As a result, a flow rate of the air discharged from the cleaning fan 25 decreases and the cleaning performance is deteriorated. Therefore, an airflow sensor may be provided in the cleaning fan box 26 to measure a flow rate (an airflow volume) of the air sucked by the cleaning fan 25 and control the number of rotation of the cleaning fan 25 in accordance with the measured value to be able to obtain the necessary airflow volume. A warning display that encourages detaching the air filter 22 from the chassis to clean it may also be performed.

With regard to the timing or the automatic control of these cleaning operations or providing the airflow sensor, the same applies to other embodiments described below.

As described above, according to the embodiment, the cleaning air taken from the cleaning inlet port 17b formed separately from the exhaust port 19a into the inside of the chassis by the cleaning fan 25 is exhausted from the inside of the chassis to the outside of the chassis via the cooling inlet port 17a. In this case, the dusts deposited on the air filter 22 are blown off to be able to well clean the air filter 22.

In order to take the cleaning air, since the cleaning inlet port 17b are provided separately from the exhaust port 19a, the air filter does not have to be added to the exhaust port 19a as in the case of using the exhaust port as an inlet port of the cleaning air. Therefore, the increase of the noise caused by providing the air filter in the exhaust port at the time of the normal drive can be prevented.

The embodiment describes the projector which is only provided with one cooling inlet port. However, some projectors are provided with a cooling inlet port whose air filter is not to be cleaned, separately from the cooling inlet port whose air filter is to be cleaned, and is also provided with a circulation fan that circulates the air from the inside to the outside of the chassis via this cooling inlet port. The circulation fan may be rotated during the rotation of the cleaning fan 25 in the projector.

Embodiment 2

Figure 5:
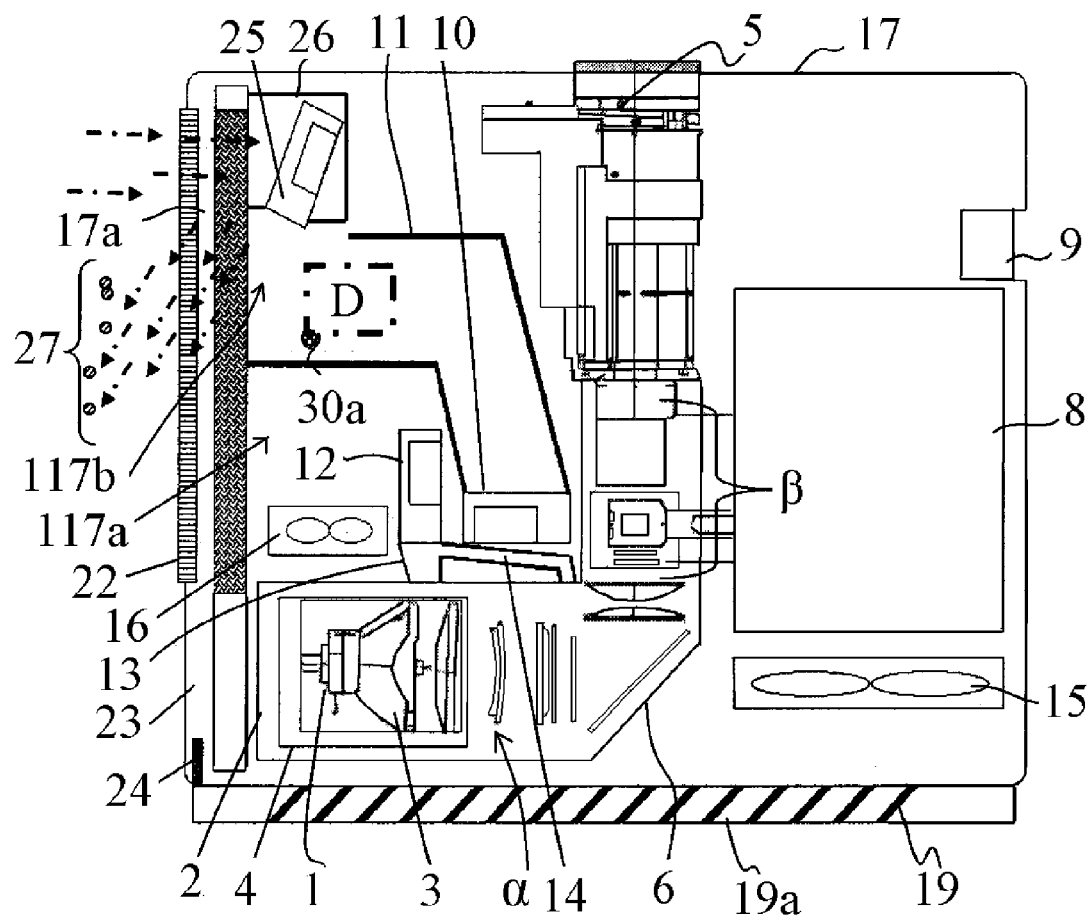
FIG. 5 is a top view illustrating an air filter cleaning operation in a projector that is Embodiment 2 of the present invention.

FIG. 5 illustrates a configuration of a liquid crystal projector that is Embodiment 2 of the present invention. The projector of the embodiment has a structure of dividing the cooling inlet port 17a formed as one member for both the cooling airflow path A and the cooling airflow path B in Embodiment 1 (FIG. 3) into an inlet port 117a for the cooling airflow path A and an inlet port 117b for the cooling airflow path B. Specifically, a wall portion of the RGB duct 11 is extended up to the cooling inlet port 17a to use the wall portion as a partition to divide the inlet port 117a for the cooling airflow path A and the inlet port 117b for the cooling airflow path B. In other words, the embodiment has the structure that leads the cooling air discharged from the cooling fan 25 to the area (the inlet port 117b for the cooling airflow path B) where the cooling air that cools the color separation/synthesis optical system β provided with the liquid crystal panel that is an optical modulation element of the cooling inlet port 17 passes. The configuration excluding this is the same as that of Embodiment 1.

In FIG. 5, the path of the air (the cleaning air) that flows caused by the rotation of the cleaning fan 25 during the cleaning operation of the air filter 22 is indicated as a cleaning airflow path D. Similarly to Embodiment 1, during the cleaning operation, the operations of all the optical cooling fan 10, the first lamp cooling fan 12, and the second lamp cooling fan 16, and the power supply exhaust fan 15 stop.

The outside air (the cleaning air) that flows from the outside to the inside of the chassis via the cleaning inlet port 17b and the air filter 22 by the rotation of the cleaning fan 25 flows into the cleaning fan box 26, and is sucked into the cleaning fan 25. The cleaning fan 25 is held by the cleaning fan box 26 so that its discharge port is tilted with respect to the cooling inlet port 17a to face it.

The cleaning air discharged from the cleaning fan 25 is guided by a wall of the RGB duct 11 to flow toward the area that covers the inlet port 117b for the cooling airflow path B of the air filter 22, and blows off the dusts 27 deposited at the outside of the area toward the outside of the chassis. As a result, the area provided for the cooling airflow path B that especially cools the color separation/synthesis optical system β of the air filter 22 can be intensively cleaned.

According to the embodiment, the color separation/synthesis optical system β is provided with the liquid crystal panel that is located near a focal plane of the projection lens 5 and is easily influenced by the dusts. Therefore, the air filter 22 that is provided with respect to the cooling airflow path B for cooling the color separation/synthesis optical system β is intensively cleaned to suppress the invasion of the dusts to the color separation/synthesis optical system β to be able to prevent the deterioration of a projected image caused by the adhesion of the dusts to the liquid crystal panel.

Embodiment 3

Figure 6:
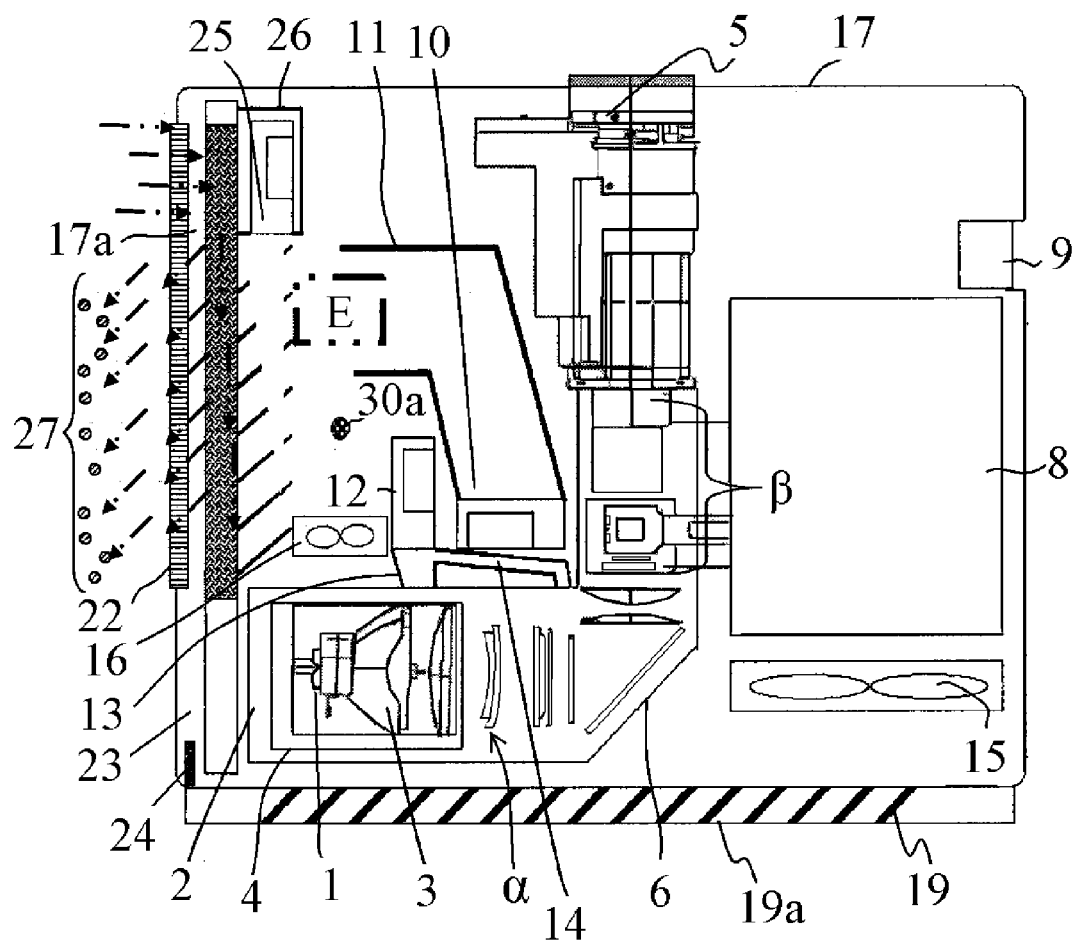
FIG. 6 is a top view illustrating an air filter cleaning operation in a projector that is Embodiment 3 of the present invention.
Figure 7:
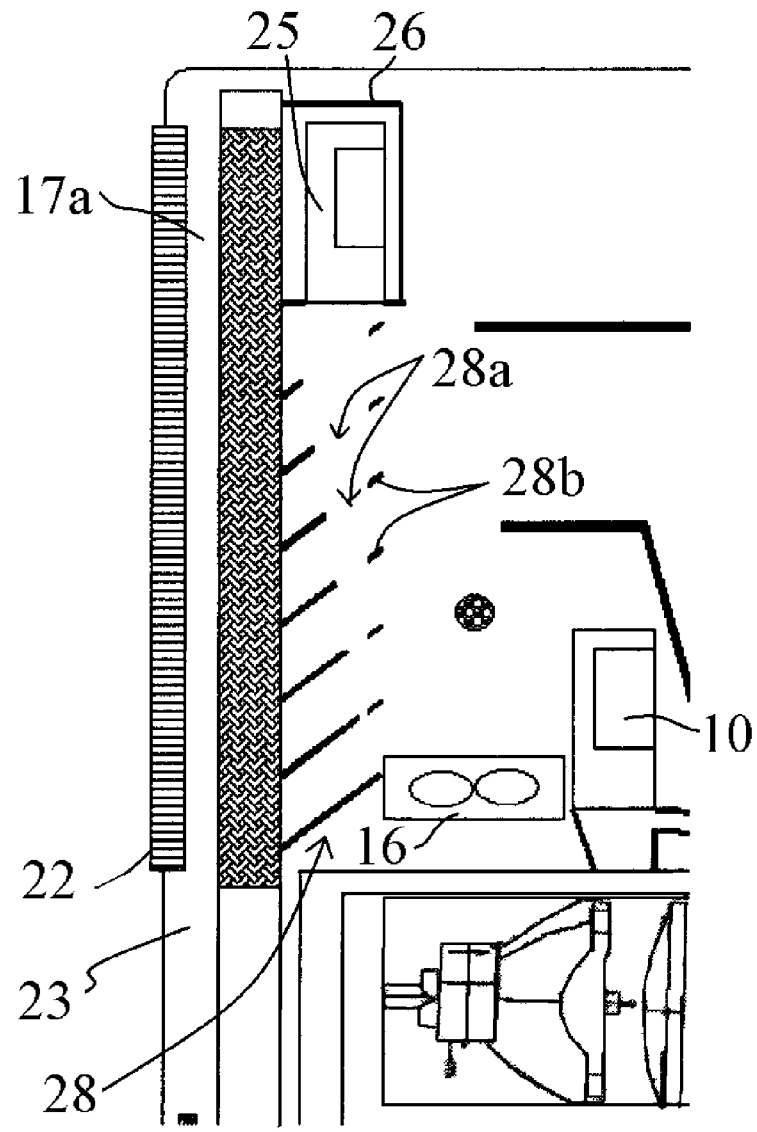
FIG. 7 is a top view illustrating an air filter cleaning part in a projector of Embodiment 3.

FIG. 6 and FIG. 7 illustrate a configuration of a liquid crystal projector that is Embodiment 3 of the present invention. The embodiment is different from Embodiment 1 in that an air guide louver (an air guide member) 28 is added and that the cooling fan 25 is disposed in parallel to the cooling inlet port 17 (so that the discharged port faces a direction in which the cooling inlet port 17 extends), and other configurations are the same as those of Embodiment 1.

In FIG. 6, a flow path of the air (cleaning air) that flows by the rotation of the cleaning fan 25 during the cleaning operation of the air filter 22 is indicated as a cleaning airflow path E. Similarly to Embodiment 1, during the cleaning operation, the operations of all the optical cooling fan 10, the first lamp cooling fan 12, and the second lamp cooling fan 16, and the power supply exhaust fan 15 stop.

The air guide louver 28 has a shape that is illustrated as an enlarged view in FIG. 7. In other words, the air guide louver 28 has a plurality of fins 28b. An opening 28a that passes the cooling air flowed from the cooling inlet port 17a toward the cooling fans 10, 12, and 16 is formed in fins 28b which are provided in a range near the cleaning fan 25 of the plurality of fines 28b. The plurality of fins 28b guide the cleaning air discharged from the cleaning fan 25 to the whole area of the cooling inlet port 17a (the air filter 22).

The outside air (cleaning air) that flows from the outside to the inside of the chassis via the cleaning inlet port 17b and the air filter 22 by the rotation of the cleaning fan 25 flows in the cleaning fan box 26 to be sucked into the cleaning fan 25. The cleaning air discharged from the cleaning fan 25 is divided and guided by the plurality of fins 28b of the air guide louver 28 to flow toward the air filter 22, and it blows off the dusts 27 deposited at the outside of the air filter 22 to the outside of the chassis.

The size of the opening 28a become smaller with distance from the cleaning fan 25, and the opening 28a is not formed in several fins 28b that are away from the cleaning fan 25. As a result, the cleaning air can also be supplied to an area far from the cleaning fan 25 of the air filter 22.

According to the embodiment, the air guide louver 28 is provided in a free space between the cooling inlet port 17a and the RGB duct 11 (the cooling fans 10, 12, and 16) to be able to set up the cleaning fan 25 in parallel to the cooling inlet port 17a and the air filter 22. As a result, a space necessary for the installation of the cleaning fan 25 can be reduced, and the growth in size of the projector can be suppressed.

Moreover, since the opening 28a that passes the cooling air is formed in the fins 28b of the air guide louver 28, the shape of the air guide louver does not have to be changed between the normal drive operation and the cleaning operation, and therefore the air filter 22 can be cleaned in a simple configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the present invention can also be applied to a projector which uses another optical modulation element such as a digital micromirror device (DMD) though the projector which uses the liquid crystal panel as an optical modulation element is described in each of the above embodiments.

This application claims the benefit of Japanese Patent Application No. 2010-013680, filed on Jan. 25, 2010 which is hereby incorporated by reference herein in its entirety.

What is claimed is:

1. An image projection apparatus that projects light modulated by an optical modulation element onto a projection surface to display an image, the image projection apparatus comprising:

a cooling fan provided inside a chassis of the image projection apparatus and configured to take in cooling air from a cooling inlet port formed in the chassis;

an air filter that covers the cooling inlet port;

an exhaust port formed in the chassis and configured to exhaust the cooling air from an inside to an outside of the chassis; and a cleaning fan provided inside the chassis and configured to take in cleaning air from a cleaning inlet port formed in the chassis separately from the exhaust port, wherein the image projection apparatus exhausts the cleaning air discharged from the cleaning fan, from the inside to the outside of the chassis via the cooling inlet port and the air filter.

2. The image projection apparatus according to claim 1, wherein the image projection apparatus has a structure that guides the cleaning air discharged from the cleaning fan to an area of the cooling inlet port and the air filter in which the cooling air cooling the optical modulation element passes.

3. The image projection apparatus according to claim 1, further comprising:

an opening that passes the cooling air flowing from the cooling inlet port to the cooling fan; and an air guide member configured to guide to the cleaning air discharged from the cleaning fan to the cooling inlet port.

4. The image projection apparatus according to claim 1, wherein a part of the air filter covers the cleaning inlet port.

5. The image projection apparatus according to claim 1, further comprising:

a sensor configured to detect a clogging of the air filter; and a controller configured to operate the cleaning fan in accordance with an output from the sensor.

* * * * *